(12) United States Patent
Okumura (10) Patent No.: US 6,431,667 B1
(45) Date of Patent: Aug. 13, 2002

(54) STRUCTURE FOR MOUNTING AND DISMOUNTING AN EQUIPMENT UNIT

(75) Inventor: Kenji Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/444,289

(22) Filed: Nov. 22, 1999

(30) Foreign Application Priority Data

Nov. 20, 1998 (JP) .......................................... 10-330742

(51) Int. Cl.[7] .............................................. E05B 65/46
(52) U.S. Cl. ................................. 312/222; 312/332.1
(58) Field of Search ............................... 312/222, 333, 312/223.1, 223.2, 332.1; 361/727, 685

(56) References Cited

U.S. PATENT DOCUMENTS

| | | | | |
|---|---|---|---|---|
| 2,609,268 A | * | 9/1952 | Nye | 312/332.1 |
| 4,002,381 A | * | 1/1977 | Wagner et al. | 312/332.1 |
| 6,198,633 B1 | * | 3/2001 | Lehman et al. | 312/332.1 |

FOREIGN PATENT DOCUMENTS

| | | |
|---|---|---|
| JP | 1-100484 | 7/1989 |
| JP | 2-62787 | 5/1990 |
| JP | 2-63584 | 5/1990 |
| JP | 5-30919 | 4/1993 |
| JP | 5-297980 | 11/1993 |
| JP | 6-152166 | 5/1994 |
| JP | 7-30263 | 1/1995 |
| JP | 7-50492 | 2/1995 |
| JP | 7-29898 | 6/1995 |
| JP | 8-263979 | 10/1996 |

* cited by examiner

Primary Examiner—Peter M. Cuomo
Assistant Examiner—Jerry A. Anderson
(74) Attorney, Agent, or Firm—Foley & Lardner (57) ABSTRACT

In a structure for mounting and dismounting an equipment unit from an apparatus body including a plate-like frame formed with a slot at a preselected end and a bore contiguous with the slot for receiving the equipment unit via the slot, the equipment unit includes a front panel and a pair of mounting members. The mounting members are positioned at opposite sides of the front panel, and each contacts, when the equipment unit is received in the apparatus body, the inner periphery of the frame at one end and is exposed to the outside of apparatus body at the other end. The mounting members each are rotatable in a direction in which the equipment unit is inserted into the apparatus body.

11 Claims, 9 Drawing Sheets

STRUCTURE FOR MOUNTING AND DISMOUNTING AN EQUIPMENT UNIT

BACKGROUND OF THE INVENTION

The present invention relates to a structure for mounting and dismounting and equipment unit and more particularly to a structure capable of surely locking a disk unit or similar equipment unit to an apparatus body.

Various structures have heretofore been proposed for mounting and dismounting a magnetic or an optical disk unit or similar equipment unit to an apparatus body. A disk array apparatus in particular must be provided with a simple mounting and dismounting configuration because it is expected to accommodate a plurality of disk units. Generally, a disk unit loaded with, e.g., a 3.5 inch hard disk has a thickness of 41.3 mm or a thickness of 25.4 mm. It has therefore been customary to provide an apparatus body capable of accommodating a 41.3 mm thick disk unit.

However, there is an increasing demand for a small size apparatus body exclusively applicable to a 25.4 mm thick disk unit. Then, it is necessary to reduce the thickness of the disk unit itself to 30 mm or less. In light of this, there has been proposed a structure for mounting and dismounting a disk unit from an apparatus body by leverage acting on a front panel included in the disk unit. There has also been proposed a structure in which a disk unit is mounted and dismounted from an apparatus body with a handle thereof held by hand.

However, the problem with the above leverage scheme is that a sufficient mounting force does not act on the disk unit unless the front panel has a width of at least about 50 mm. This obstructs the thin configuration of the entire disk unit. The handle scheme also obstructs the thin configuration because the disk unit needs a width great enough for the operator to hold the handle.

Technologies relating to the present invention are also disclosed in, e.g., Japanese Utility Model Laid-Open Publication No. 5-30919 and Japanese Patent Laid-Open Publication No. 7-50492.

SUMMARY OF THE INVENTION

It is therefore an object of the present invention to provide a structure capable of preventing a disk unit or similar equipment unit from slipping out of an apparatus body due to vibration and allowing the operator to easily mount and dismount the equipment unit from the apparatus body.

In accordance with the present invention, in a structure for mounting and dismounting an equipment unit from an apparatus body including a plate-like frame formed with a slot at a preselected end and a bore contiguous with the slot for receiving the equipment unit via the slot, the equipment unit includes a front panel and a pair of mounting members. The mounting members are positioned at opposite sides of the front panel, and each contacts, when the equipment unit is received in the apparatus body, the inner periphery of the frame at one end and is exposed to the outside of apparatus body at the other end. The mounting members each are rotatable in a direction in which the equipment unit is inserted into the apparatus body.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, brief reference will be made to a conventional structure for mounting and dismounting an equipment unit. Today, a hard disk, for example, to be accommodated in a disk unit and therefore the disk unit itself and an apparatus body to be loaded with the disk unit are noticeably decreasing in size. Generally, a disk unit loaded with, e.g., a 3.5 inch hard disk has a thickness of 41.3 mm or a thickness of 25.4 mm. It has therefore been customary to provide an apparatus body capable of accommodating a 41.3 mm thick disk unit. However, there is an increasing demand for a small size apparatus body exclusively applicable to a 25.4 mm thick disk unit. Then, it is necessary to reduce the thickness of the disk unit itself to 30 mm or less.

Figure 1A:
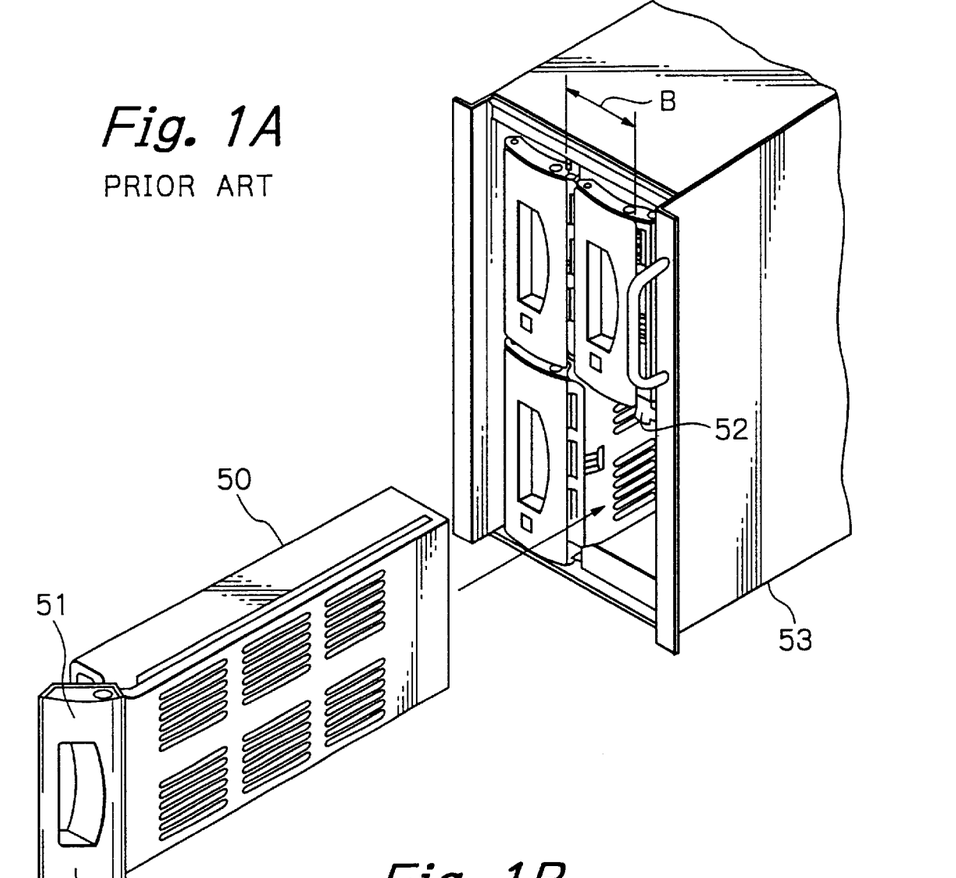
FIG. 1A is an isometric view showing a conventional structure for mounting and dismounting an equipment unit from an apparatus body.
Figure 1B:
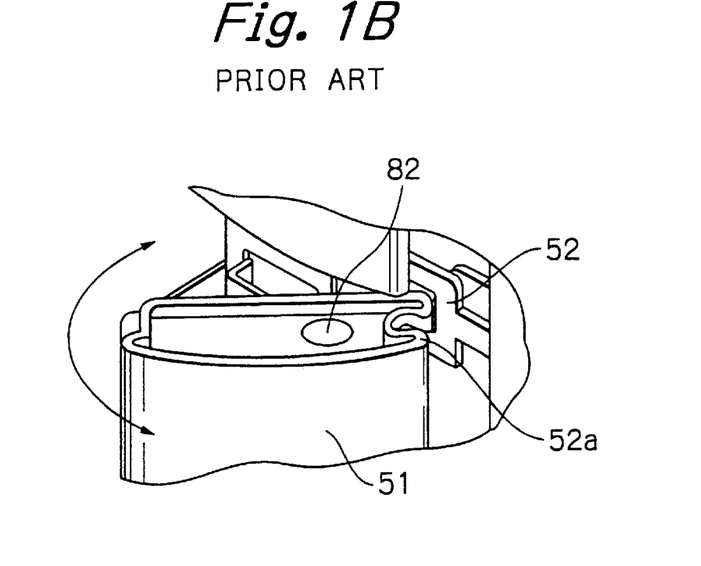
FIG. 1B is a fragmentary isometric view showing the equipment unit of FIG. 1 received in the apparatus body.

FIGS. 1A and 1B show a conventional disk array apparatus made up of a disk unit 50 and an apparatus body 53. The disk unit 50 includes a front panel 51 rotatable about a point 82. To mount the disk unit 50 to the apparatus body 53, the operator mates a claw 52a included in the front panel 51 with a guide 52 included in the apparatus body 53. Subsequently, the operator pushes a handle 51a also included in the front panel 51 in order to insert the disk unit 50 into the apparatus body 53. To dismount the disk unit 50 from the apparatus body 53, the operator pulls the handle 51a toward the operator. As a result, the disk unit 50 is pulled out of the apparatus body 53 by leverage implemented by the claw 52a serving as a fulcrum, the point 82 serving a point of action, and the handle 51a serving as a point of force.

The above conventional structure has the previously discussed problems left unsolved.

Figure 2:
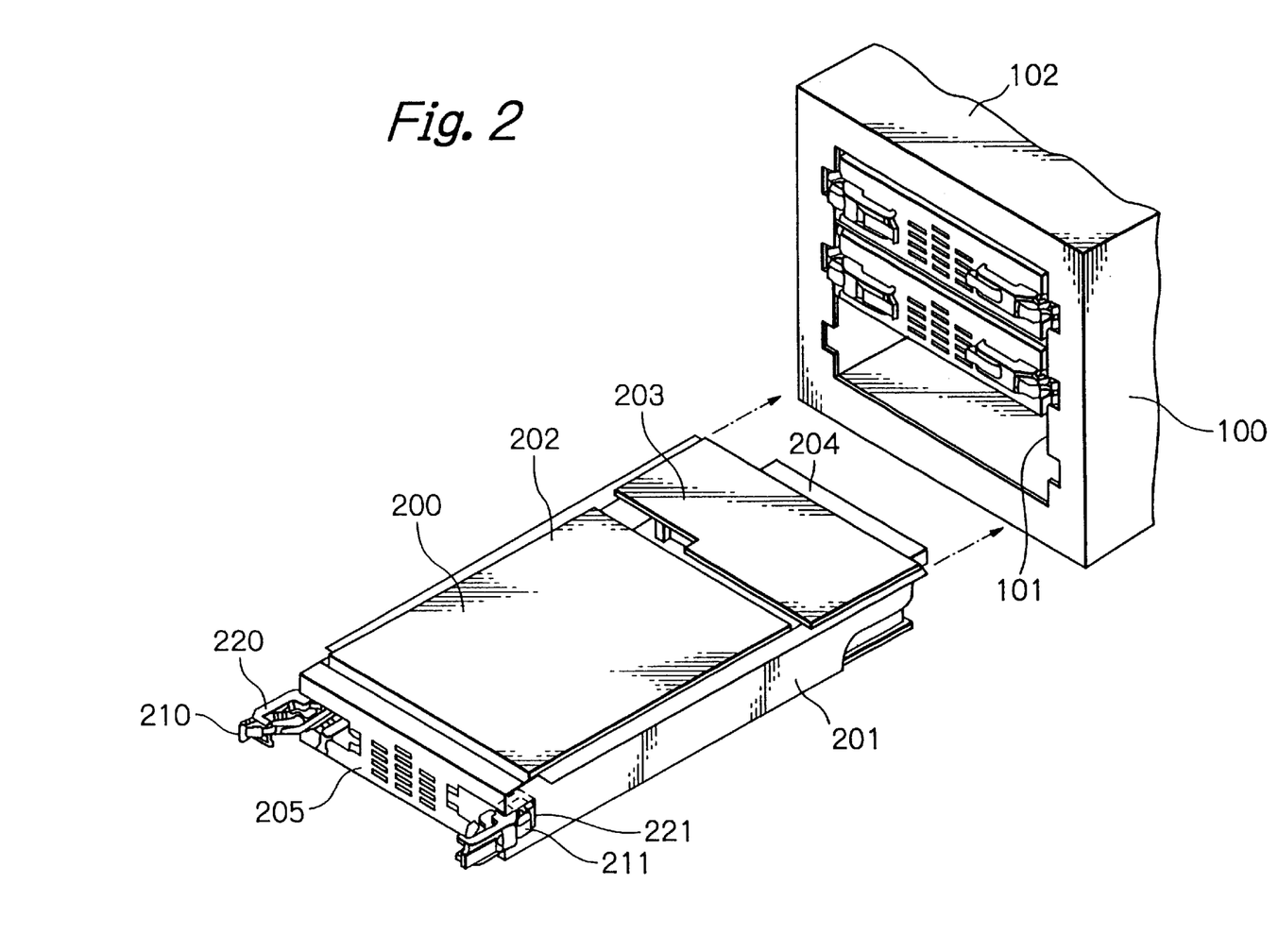
FIG. 2 is an isometric view showing an equipment unit mounting and dismounting structure embodying the present invention.

Referring to FIG. 2, an equipment unit mounting and dismounting structure embodying the present invention is shown. As shown, the structure is generally made up of an apparatus body 100 and a disk unit or similar equipment unit 200 capable of being inserted into a slot 101 formed in the apparatus body 100. The apparatus body 100 includes a guide plate or plate-like frame 102 surrounding the slot 101. The equipment unit 200 includes a front panel 205 mounted on its front end and a pair of lock plates or mounting members 220 positioned at both sides of the front plate 205 and formed of an elastically deformable material. When the disk unit 200 is inserted into the slot 101, the lock plates 220 engages with the front panel 205.

Each lock plate 220 extends in the lengthwise direction of the front end of the disk unit 200 and has one end thereof implemented as a claw 221 serving as an ejector for inserting the disk unit 200 into the slot 101. When the claw 221 positioned on the front of the disk unit 200 is pulled by hand, it is rotated and causes the lock plate 220 to elastically deform out of engagement with the front panel 205. The disk unit 200 further includes a pair of unlock plates or mounting/dismounting members 210. One end of each unlock plate 210 is implemented as a lug 211 serving as an ejector when the disk unit 200 is inserted into or removed from the slot 101.

When the disk unit 200 is inserted into the slot 101 with its lock plates 220 or unlock plates 210 pressed by hand, the disk unit 200 is surely locked to the apparatus body 100. When the unlock plates 210 are pulled by hand, the lock plates 220 are automatically released from the front panel 205 and allow the disk unit 200 to be pulled out by hand. When the disk unit 200 is received in the apparatus body 100, the front panel 205 of the disk unit 200 and the guide plate 102 of the apparatus body 100 are locked to each other by the lock plates 220. In this condition, the disk unit 200 is prevented from slipping out of the apparatus body 100 when subjected to vibration.

More specifically, as shown in FIG. 2, the slot 101 of the apparatus body 100 is so configured as to accommodate a stack of disk units 200. Each disk unit 200 is taken into and out of the slot 101 via the front end of the slot 101. When the disk unit 200 is inserted into the slot 101, a connector 204 mounted on the rear of the disk unit 200 is connected to a plug-in connector, not shown, arranged at the deepest end of a bore contiguous with the slot 101, setting up electrical connection of the disk unit 200 to the apparatus body 100.

When the disk unit 200 is inserted into the slot 101, the lock plates 220 mounted on the disk unit 200 are engaged with the front panel 205 and thereby affixed to the disk unit 200. At the same time, the claw 220 of each lock plate 220 contacts the guide plate 102 of the apparatus body 100. In this condition, the disk unit 200 is surely locked to the apparatus body 100.

Figure 3:
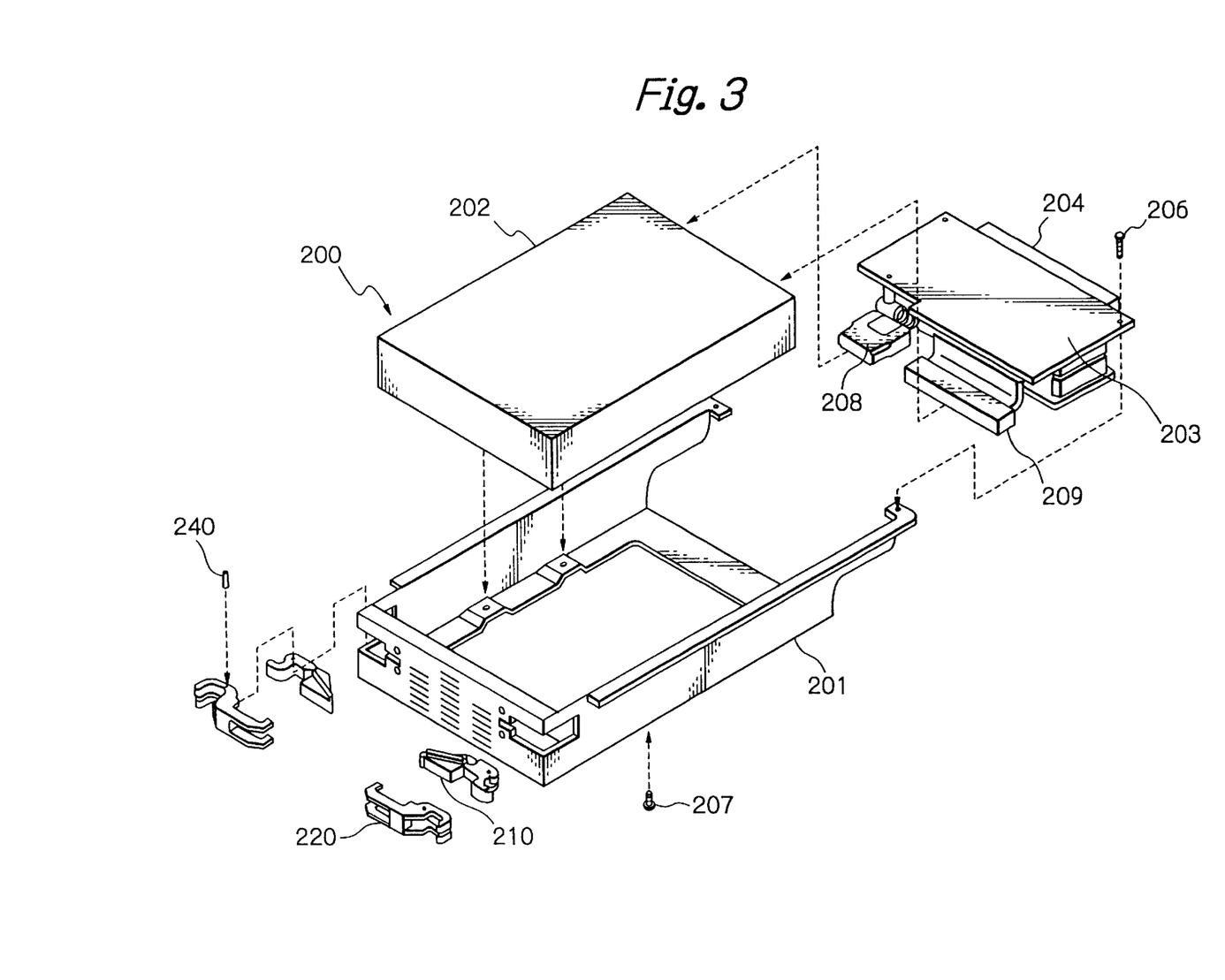
FIG. 3 is an exploded isometric view showing an equipment unit include in the illustrative embodiment.

As shown in FIG. 3 specifically, the disk unit 200 is made up of a shallow plate-like base 201, a hard disk 202 accommodated in the base 201, and a relay package 203 including the previously mentioned connector 204. The base 201, hard disk 202 and relay package 203 are fastened to the base 201 by screws 206 and 207. The relay package 203 includes a power supply connector 208 and an interface connector 209 in addition to the connector 204. The power supply connector 208 feeds drive power to the hard disk 202 while the interface connector 209 transfers a write/read signal to the hard disk 202. The lock plates 220 and unlock plates 210 are mounted on opposite ends of the front end of the base 201 in pairs. A pin 240 extends throughout each lock plate 220 and associated unlock plate 210, so that the plates 220 and 210 are supported by the disk unit 200 via the pin 240. This is also true with the lock plate 220 and unlock plate 210 located at the other end of the front end of the base 201.

Figure 4:
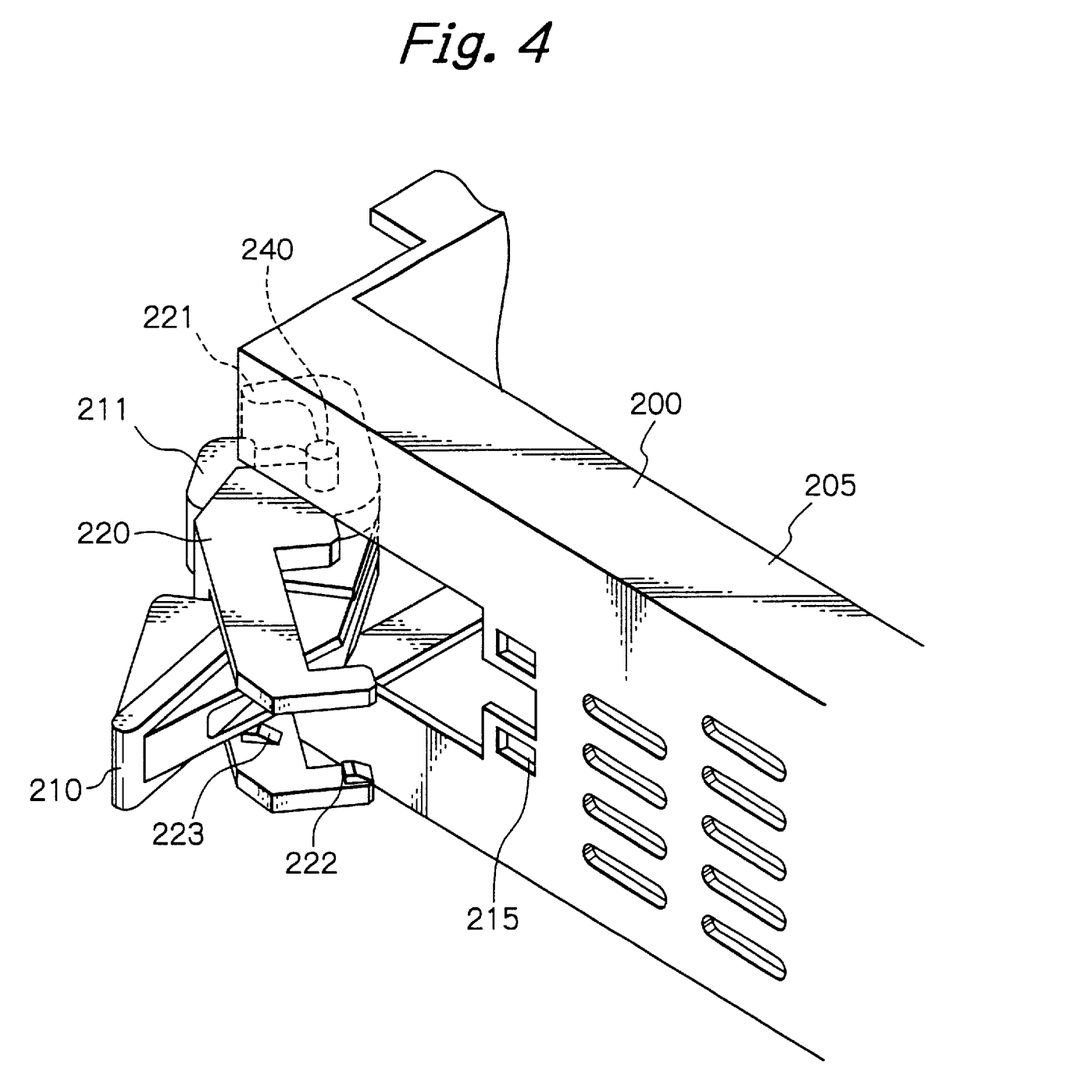
FIG. 4 is an enlarged isometric view showing a mounting member and a mounting/dismounting member included in the equipment unit of FIG. 3.

FIG. 4 shows in an enlarged view the left part of the disk unit 200 where the lock plate 220 is positioned by way of example. As shown, he lock plate 220 is bifurcated to sandwich the unlock plate 210 with two arm portions in the up-and-down direction, as viewed in FIG. 4. The lock plate 220 is formed of elastic plastics or may alternatively be formed of metal, if desired. The lock plate 220 has bosses or unlock lugs 223 (only one is visible) and hooks or lock lugs 222 (only one is visible). The hooks 222 are positioned at the outermost end of the lock plate 220 and so tapered as to increase in dimension in the up-and-down direction in FIG. 4. When the unlock plate 210 is rotated by hand, the bosses 223 abut against part of the associated unlock plate 210. When unlock plate 210 is further rotated, the outer portion of the unlock plate 210 enters a gap between the bosses 223 and causes the lock plate 220 to elastically deform outward by an amount corresponding to the projection of the bosses 223.

The claw 221 forming part of the lock plate 220 is engageable with the inner periphery of the guide plate 102 of the apparatus body 100. The unlock plate 210 also includes projection of lug 211 similar in configuration to the claw 221.

Grooves 215 are formed in the front panel 205 of the disk unit 200 for receiving the hooks 222. When the outermost end of the lock plate 220 is elastically deformed, the hooks 222 are brought into or out of engagement with the grooves 215.

Figure 7:
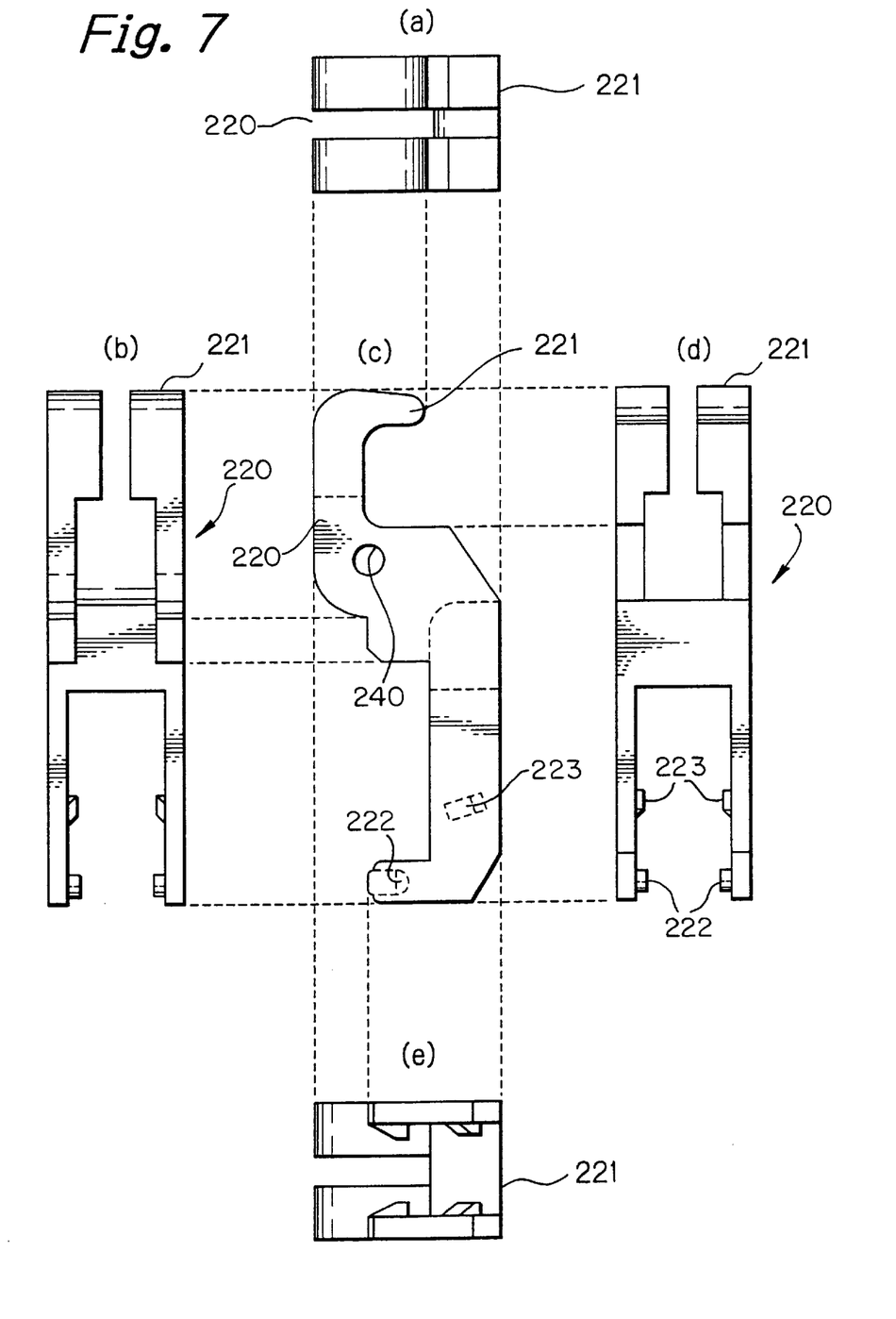
FIG. 7 is a view showing the mounting member, (a), (b), (c), (d) and (e) being a plan view, a side elevation as seen from the left, a front view, a side elevation as seen from the right, and a bottom view, respectively.
Figure 8:
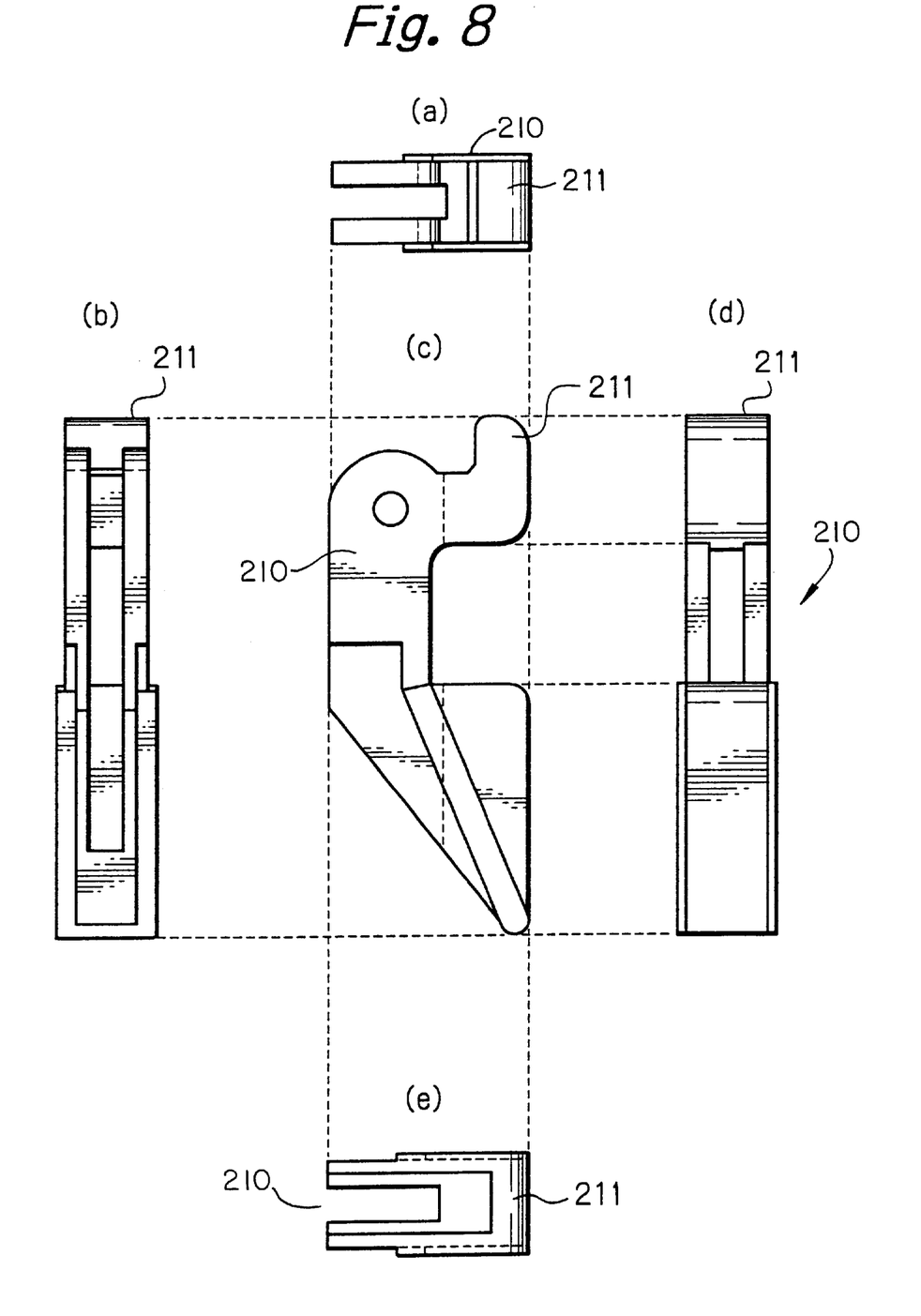
FIG. 8 is a view showing the mounting/dismounting member, (a) (b), (c), (d) and (e) being a plan view, a side elevation as seen from the left, a front view, a side elevation as seen from the right, and a bottom view, respectively.
Figure 9:
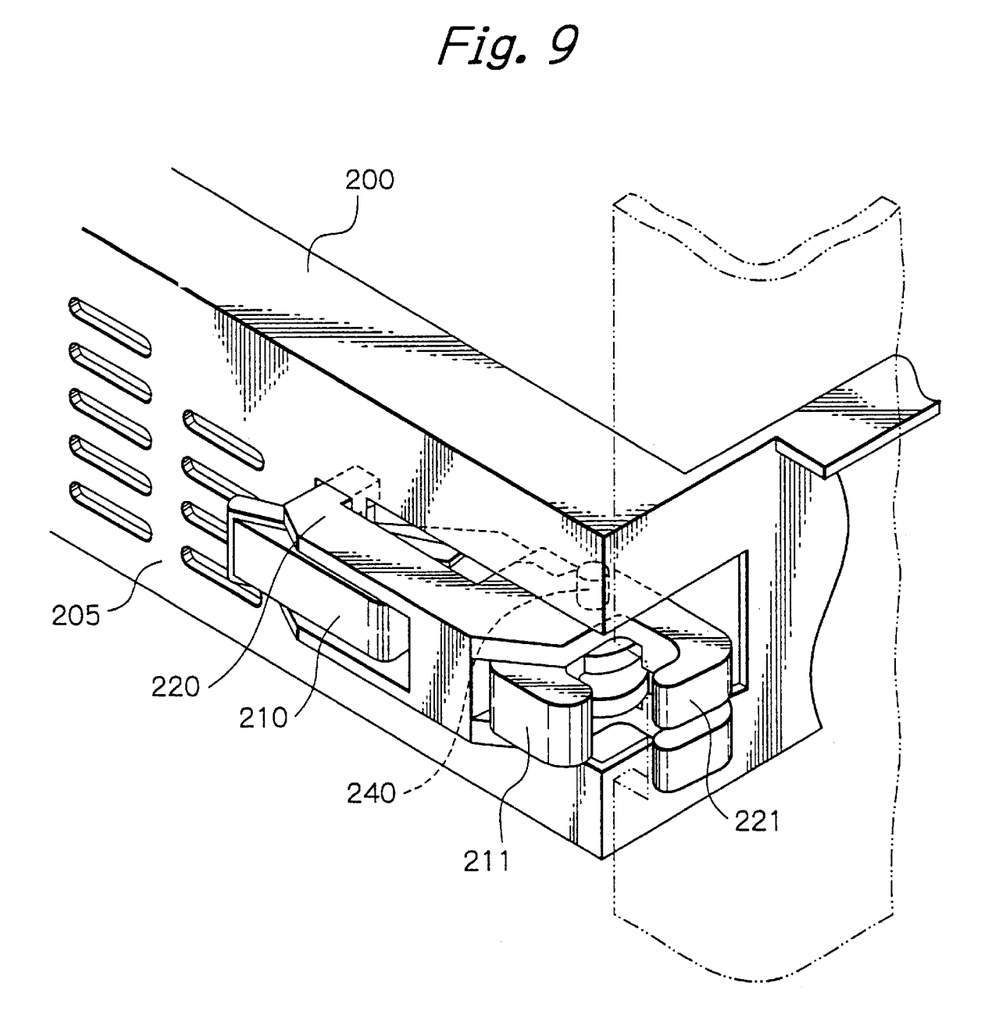
FIG. 9 is a fragmentary isometric view showing the mounting member and mounting/dismounting member in a condition wherein the equipment unit is locked to the apparatus body.

FIGS. 7 and 8 respectively show the lock plate 220 and unlock plate 210 more specifically. FIG. 9 shows the disk unit 200 locked to the apparatus body 100 via the lock plate 220 and unlock plate 210.

Figure 5A:
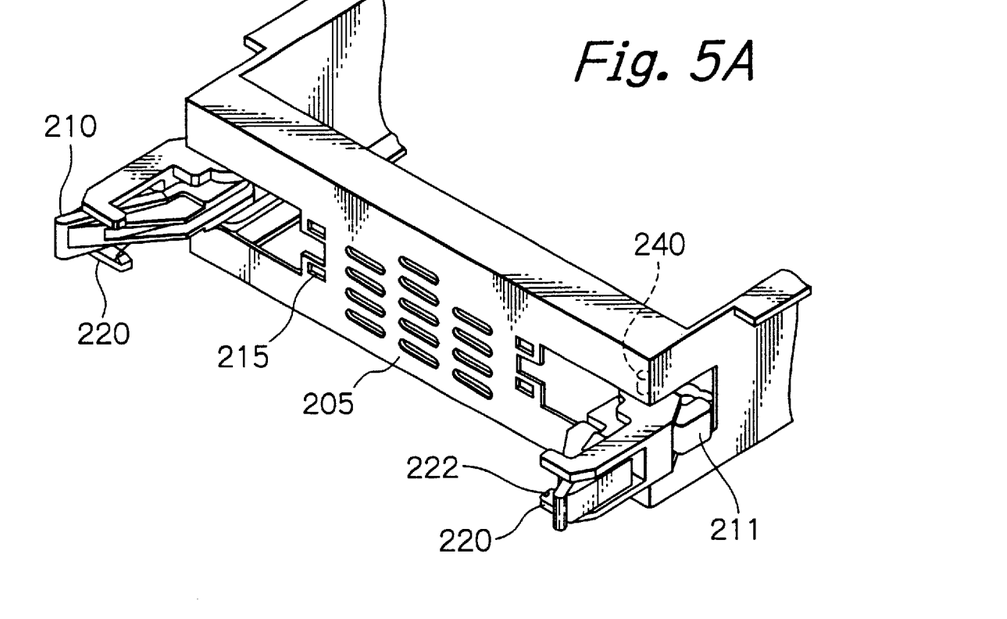
FIGS. 5A and 6A are fragmentary isometric views showing the equipment unit of the illustrative embodiment conditioned to be inserted into an apparatus body.

The operation of the illustrative embodiment will be described hereinafter. As shown in FIG. 5A, to mount the disk unit 200 to the apparatus body 100, the operator rotates, or opens, the unlock plates 210 and lock plates 220 forward away from each other. Subsequently, the operator inserts the disk unit 200 into the slot 101 until the lugs 211 of the unlock plates 210 contact the guide plate 102 of the apparatus body 100. At this instant, the connector 204 of the disk unit 200 has not been connected to the plug-in connector of the apparatus body 100 yet.

Figure 5B:
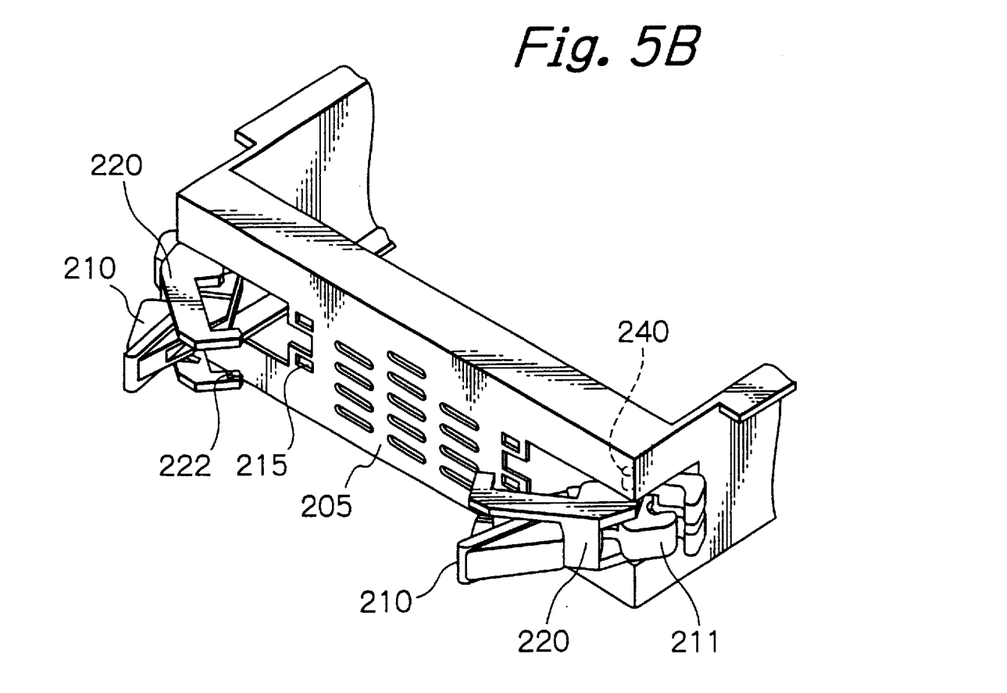
FIGS. 5B and 6B are fragmentary isometric views showing the equipment unit conditioned to be pushed into the apparatus body.

Subsequently, as shown in FIG. 5B, the operator rotates, or closes, the lock plates 220 toward each other, i.e., toward the disk unit 200 until the claws 221 thereof abut against the inner periphery of the guide plate 102.

As the operator further rotates the lock plates 220 in the above direction, the hooks 222 positioned at the ends of the lock plates 220 contact the front panel 205. As a result, the lock plates 220 are elastically deformed outward due to the tapered hooks 222. As soon as the ends of the lock plates 220 get over the front panel 205, the lock plates 220 are elastically restored and caused to mate with the grooves 215. At this instant, the disk unit 200 is pushed deeper into the apparatus body 100 with the contact points of the claws 221 and guide plate 102 serving as a fulcrum and with the pins 240 supporting the lock plates 220 on the disk unit 200 serving as a point of action. At the same time, the connector 204 of the disk unit 200 is brought into connection with the plug-in connector of the apparatus body.

When the operator brings the hooks 222 of the lock plates 220 into engagement with the front panel 205, the lock plates 220 and therefore the unlock plates 210 are pressed.

Figure 6A:
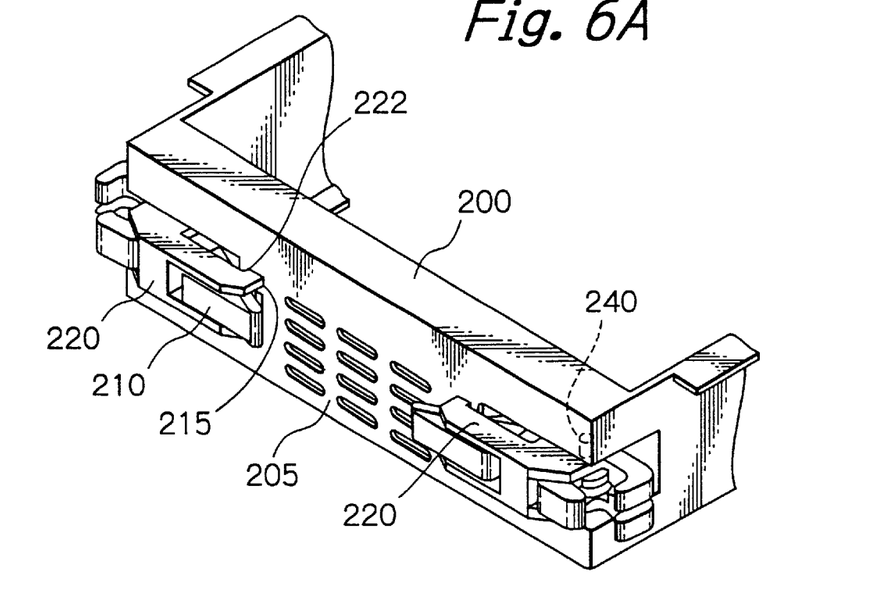

Consequently, the unlock plates 210 are positioned substantially parallel to the front panel 205. FIG. 6A shows the disk unit 200 fully mounted to the apparatus body 100.

Figure 6B:
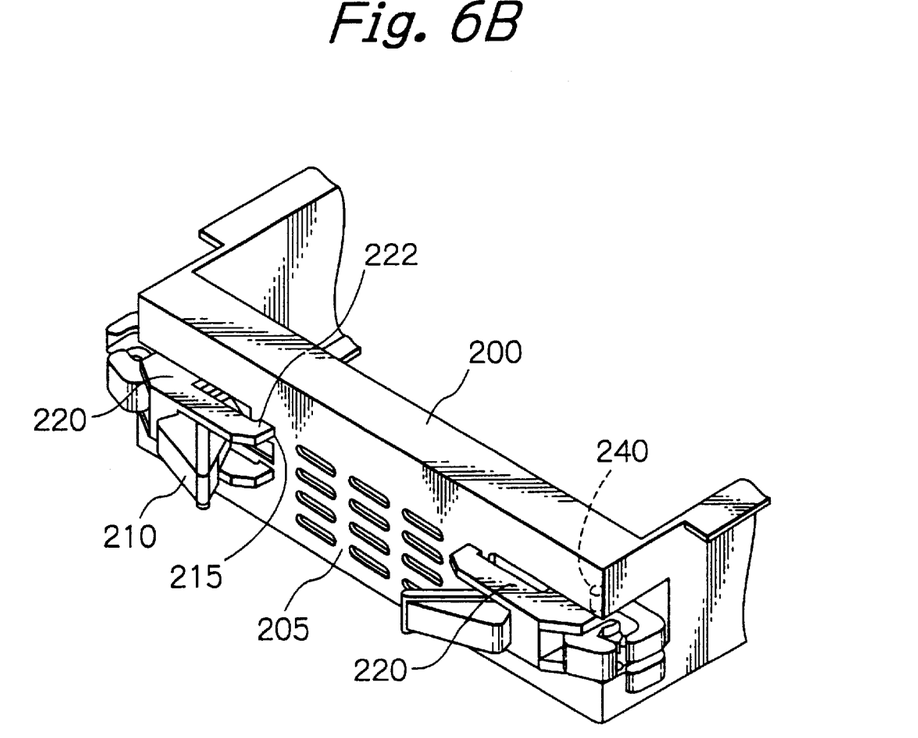

To remove the disk unit 200 held in the position of FIG. 6A from the apparatus body 100 via the slot 101, the operator rotates, or opens, the unlock plates 210 outward of the disk unit 200. At this instant, the unlock plates 210 rotate, but the lock plates 220 do not rotate because their hooks 222 are engaged with the grooves 215 of the front panel 205. Opposite sides of each unlock plate 210 partly contact the bosses 223 of the associated lock plate 220. As the operator further rotates the unlock plates 210, the unlock plates 210 cause the associated lock plates 220 to elastically deform outward due to the tapered bosses 223. As a result, the hooks 222 of the lock plates 220 are released from the associated grooves 215, as shown in FIG. 6B.

When the operator further rotates the unlock plates 210 away from the disk unit 200, the lugs 211 of the unlock plates 210 abut against the guide plate 102 of the apparatus body 100. Then, the contact points of the lugs 211 of the unlock plates 210 and guide plate 102 serve as a fulcrum while the pins 240 serve as a point of action. As a result, the connector 204 of the disk unit 200 is pulled out of the plug-in connector of the apparatus body 100, and the disk unit 200 is bodily ejected from the apparatus body 100. In this condition, the operator can easily pull the disk unit 200 out of the slot 101 by holding the base 201 of the disk unit 200.

As stated above, when the operator intending to pull the disk unit 200 out of the apparatus body 100 rotates the unlock plates 210, the lock plates 220 are automatically released form the front panel 205. At the same time, the connector 204 of the disk unit 200 is automatically pulled out of the plug-in connector of the apparatus body 100. The operator therefore should only pull the disk unit 200 out of the slot 101 with a minimum of force.

Further, the operator can easily mount the disk unit 200 to the apparatus body 100 by inserting the disk unit 200 and then pushing the lock plates 220. Because the lock plates 220 and unlock plates 210 are so extended as to be rotatable in the widthwise direction of the disk unit 200, the plates 220 and 210 each can be provided with a substantial length without regard to the height of the disk unit 200. This is successful to reduce the operator's effort required to rotate the plate 220 and 210 and therefore to promote easy operation.

Moreover, the mounting members and mounting/dismounting members extend in the lengthwise direction of the front end of the equipment unit, so that each of them can be provided with a length necessary for rotation even when the equipment unit is reduced in thickness. This further promotes easy operation.

In summary, in accordance with the present invention, an equipment unit mounting and dismounting structure includes mounting members and mounting/dismounting members each being rotatable in the direction in which an equipment unit is inserted into an apparatus body. The equipment unit can therefore be mounted to the apparatus body only if the mounting members are rotated by hand. Also, the equipment unit can be easily removed from the apparatus body only if the mounting/dismounting members are rotated in the opposite direction to the mounting members in order to release the mounting members from the equipment unit. Particularly, when the ends of the mounting members are engaged with the equipment unit, they prevent the equipment unit from slipping out of the apparatus body despite vibration which may act on the apparatus body.

Various modifications will become possible for those skilled in the art after receiving the teachings of the present disclosure without departing from the scope thereof. For example, the lock plates 220 each sandwiching the associated unlock plate 210 with an upper and a lower arm thereof, only one of the upper and lower arms suffices. The locking device using the hooks 222 of the lock plates 220 and the grooves 215 of the front panel 205 is only illustrative and may be replaced with any other suitable locking device. Of course, the present invention is applicable not only to a disk unit shown and described, but also to a power supply unit or similar equipment package to be mounted and dismounted from an apparatus body.

What is claimed is:

1. A structure comprising:

an equipment unit, an apparatus body including a frame formed with a slot at one end and a bore contiguous with said slot for receiving said equipment unit, said equipment unit comprises:

a front panel;

a pair of locking members positioned at opposite sides of said front panel and each contacting , when said equipment unit is received in said apparatus body, an inner periphery of said frame and being exposed to an outside of said apparatus body, said pair of locking members each being rotatable in a direction in which said equipment unit is inserted into said apparatus body and being operative to lock said equipment unit to said apparatus body; and a pair of unlocking members positioned at opposite sides of said front panel and each contacting, when said equipment unit is received in said apparatus body, an outer periphery of said frame and being exposed to an outside of said apparatus body, and wherein said pair of unlocking members each are rotatable in a direction in which said equipment unit is inserted into or removed from said apparatus body, and wherein rotation of said unlocking member releases said locking member from locking said equipment unit to said apparatus body.

2. A structure as reciting claim 1 further comprising means for automatically releasing said locking members upon rotation of unlocking members.

3. A structure as claimed in claim 1, wherein said equipment unit further comprises grooves formed in said front panel for receiving a portion of said pair of locking members.

4. A structure as claimed in claim 3, wherein said front panel is formed with at least a pair of grooves and wherein each of said locking members is formed with a lug contacting an inner periphery of said front panel when said lug is inserted into an associated one of said grooves.

5. A structure as claimed in claim 3, wherein:

said locking members comprise at least one arm formed of an elastic material, and said equipment unit further comprise a pin for rotationally mounting said locking member and said unlocking member, and said locking members each include at least one lug insertable in a groove in a front panel of said apparatus body for locking said equipment unit to said apparatus body said lugs mounted on said arms and said arms being moved by rotation of said unlocking members to release said lugs from said grooves.

6. A structure as claimed in claim 5, wherein said locking members are each bifurcated to thereby form two arms sandwiching the associated unlocking member, and wherein said at least one lug comprise two lugs formed on each of said two arms.

7. A structure as claimed in claim 1, wherein said front panel is formed with a pair of grooves and wherein the locking members are formed with a lock lug contacting an inner periphery of said front panel through said grooves when said equipment unit is inserted in said apparatus body.

8. A structure as claimed in claim 7 wherein: said locking members comprise at least one arm formed of an elastic material, and     said equipment unit further comprise a pin for rotationally mounting said locking member and said unlocking member, and     said locking members each include at least one lug insertable in a groove in a front panel of said apparatus body for locking said equipment unit to said apparatus body     said lugs mounted on said arms and said arms being moved by rotation of said unlocking members to release said lugs from said grooves.

9. A structure as claimed in claim 8, wherein said locking members are each bifurcated to thereby form two arms sandwiching the associated unlocking member, and wherein said at least one lug comprise two lugs formed on each of said two arms.

10. A structure as claimed in claim 1, wherein said equipment unit further comprises grooves formed in said front panel for receiving a portion of said pair of locking members.

11. A structure as recited in claim 5 wherein each of said locking members includes at least one boss for contacting said unlocking members during rotation of said unlocking member so as to release said lugs of said locking members from said grooves.

\* \* \* \* \*